United States Patent
Gonsa et al.

(10) Patent No.: US 8,249,018 B2
(45) Date of Patent: Aug. 21, 2012

(54) UPE RELOCATION FOR ROUTE OPTIMIZATION DURING HANDOVER BETWEEN NEIGHBOURING NETWORK AREAS

(75) Inventors: Osvaldo Gonsa, Langen (DE); Ralf Becker, Langen (DE)

(73) Assignee: Panasonic Corporation, Osaka (JP)

( * ) Notice: Subject to any disclaimer, the term of this patent is extended or adjusted under 35 U.S.C. 154(b) by 543 days.

(21) Appl. No.: 12/516,949

(22) PCT Filed: Nov. 22, 2007

(86) PCT No.: PCT/EP2007/010156
§ 371 (c)(1),
(2), (4) Date: Jul. 14, 2009

(87) PCT Pub. No.: WO2008/064820
PCT Pub. Date: Jun. 5, 2008

(65) Prior Publication Data
US 2009/0303914 A1    Dec. 10, 2009

(30) Foreign Application Priority Data
Dec. 1, 2006 (EP) .................................... 06024942

(51) Int. Cl.
*H04W 4/00* (2009.01)
*H04W 36/00* (2009.01)
(52) U.S. Cl. ...................... 370/331; 370/390; 455/432.3; 455/436
(58) Field of Classification Search .......................... None
See application file for complete search history.

(56) References Cited

U.S. PATENT DOCUMENTS
2002/0196749 A1    12/2002 Eyuboglu
(Continued)

FOREIGN PATENT DOCUMENTS
WO    2004/047467    6/2004
(Continued)

OTHER PUBLICATIONS
3GPP TR 25.813 ("Technical Specification Group Radio Access Network; Evolved Universal Terrestrial Radio Access (E-UTRA) and Evolved Universal Terrestrial Radio Access Network (E-UTRAN); Radio interface protocol aspects (Release 7)", Jun. 2006, Version 7.0.0.*

(Continued)

*Primary Examiner* — Andrew Chriss
(74) *Attorney, Agent, or Firm* — Dickinson Wright PLLC

(57) ABSTRACT

The invention relates to a method for managing the mobility of a mobile terminal, while receiving a service via an access node of a mobile communication network. The mobile communication network has overlapping pool areas, while the access node is assigned to at least two pool areas simultaneously. After the UE changes to the access node of the overlapping area, it is proposed that the mobility management entity serving the UE arbitrarily selects a prospect user plane entity for transporting service data into the next pool areas, and requests from the service provider information about UPEs handling this service. After the actual attachment to an access node within the new pool area, the handover is finalized by changing the UPE from the old one to the selected UPE in the new pool area. Thereby, the data path from the service provider to the UE is constantly being optimized.

26 Claims, 6 Drawing Sheets

U.S. PATENT DOCUMENTS

| | | | |
|---|---|---|---|
| 2004/0053627 | A1 | 3/2004 | Fiter |
| 2004/0152453 | A1 | 8/2004 | Hayashi |
| 2007/0213060 | A1* | 9/2007 | Shaheen ........................ 455/436 |
| 2007/0291674 | A1* | 12/2007 | Cheng et al. ................... 370/312 |
| 2008/0098467 | A1* | 4/2008 | Miller et al. ....................... 726/5 |

FOREIGN PATENT DOCUMENTS

| | | |
|---|---|---|
| WO | 2004/071117 | 8/2004 |

OTHER PUBLICATIONS

International Search Report dated Apr. 3, 2008.

3GPP TR 25.912 V7.0.0, "3rd Generation Partnership Project; Technical Specification Group Radio Access Network; Feasibility study for evolved Universal Terrestrial Radio Access (UTRA) and Universal Terrestrial Radio Access Network (UTRAN), (Release 7)" 3rd Generation Partnership Project, Technical Report, Release 7, Jun. 2006, vol. 7.0.0, pp. Cover-57.

3GPP TR R3.018 V0.4.1, "3rd Generation Partnership Project; Technical Specification Group Radio Access Network; Evolved UTRA and UTRAN; Radio Access Architecture and Interfaces (Release 7)," 3rd Generation Partnership Project, Technical Specification, Release 7, May 2006, vol. 0.4.1, pp. 1-67.

3GPP TS 23.246 V6.6.0, "3rd Generation Partnership Project; Technical Specification Group Services and System Aspects; Multimedia Broadcast/Multicast Service (MBMS); Architecture and functional description (Release 6)," 3rd Generation Partnership Project, Technical Specification, Release 6, Mar. 2005, vol. 6.6.0, pp. 1-45.

3GPP TS 23.236 V6.3.0, "3rd Generation Partnership Project; Technical Specification Group Services and System Aspects; Intra-domain connection of Radio Access Network (RAN) nodes to multiple Core Network (CN) nodes (Release 6)" 3rd Generation Partnership Project, Technical Specification, Release 6, Mar. 2006, vol. 6.3.0, pp. 1-37.

* cited by examiner

UPE RELOCATION FOR ROUTE OPTIMIZATION DURING HANDOVER BETWEEN NEIGHBOURING NETWORK AREAS

FIELD OF THE INVENTION

The invention relates to a handover procedure in which the serving UPE is changed so as to achieve an optimal route between a service provider and the mobile terminal. Said handover procedure is based on an access node for providing the service of the service provider to the mobile terminal, wherein the access node is assigned to at least two pool areas simultaneously. Further, the present invention relates to several entities of a communication network that participate in the handover procedure, such as a mobility management entity, a user plane entity or the service provider.

TECHNICAL BACKGROUND

Mobile communication systems, such as the universal mobile telecommunications system (UMTS) or SAE/LTE, can carry both voice and data traffic via fixed, wireless and satellite networks. These communication systems are incessantly evolving, thereby also developing and providing packet frameworks for the delivery of IP based, real-time, conversational or multimedia services. For instance, a service provided for mobile users is the Multimedia Broadcast/Multicast Service (MBMS), which has been standardized by the 3GPP (see 3GPP TS 23.246 v6.6.0: "Multimedia Broadcast/Multicast Service (MBMS); Architecture and functional description (Release 6)", incorporated herein by reference, available from http://www.3gpp.org).

The MBMS service is a downlink multicast service for transmitting the same downlink data to a plurality of recipients through a radio network. The recipients typically share one radio channel in the radio network, a shared radio bearer for the reception of MBMS service data. The MBMS service supports the transmission of multimedia data such as real-time image and voice, or text.

Generally, mobile communications systems via which said service may be provided to users can be split into logically separated parts providing dedicated functionalities. These parts are usually called core network (CN) and access network (AN) with several access nodes. Particularly for wireless mobile communications systems the latter part is usually referred to as radio access network (RAN).

Typically, the network entities handling the network attach functionality are located in the core network of the mobile communications system. Entities in the radio access network and core network utilize defined interfaces to communicate between each other. In order to allow a distribution of the load caused by the mobile terminals across several core network entities, each radio access network entity handling the radio connection with the mobile terminal has to have a relation (i.e. interface) to a plurality of core network entities. As there are several radio access network entities deployed in a mobile communications system, this results in a many-to-many relation between the core network entities and the radio access network entities (see for example 3GPP TR 25.912, "Feasibility study for evolved Universal Terrestrial Radio Access (UTRA) and Universal Terrestrial Radio Access Network (UTRAN)", version 7.0.0, available at http://www.3gpp.org and being incorporated herein by reference).

Considering the deployment of a mobile communications system in a large area, e.g. a whole country, it becomes obvious that a many-to-many relation cannot exist between all radio access network entities and all core network entities. As transport network connectivity has to be regionally or logically restricted, e.g. due to security reasons or due to other network operational reason, only a subset of all radio access network entities might have an interface to a subset of all core network entities. All those entities with an interface between them can be considered as being part of a logic region within the entire mobile communications network, which is typically called a pool area.

Taking into account network deployment aspects, such a pool area consists of a number of radio access network entities, which are geographically related to one or several core network entities, and where an interface exits between each entity of that pool area. Further, considering network deployment aspects it could be the case that different pool areas overlap each other (see for example 3GPP TR R3.018, "Evolved UTRA and UTRAN; Radio Access Architecture and Interfaces", version 0.4.1, available at http://www.3gpp.org and being incorporated herein by reference).

This might be required in order to avoid excessive signaling, which would occur when a mobile terminal is moving along a hard border between different pool areas. In such a case the mobile would frequently switch the association from one to the other pool area due to varying signal strengths received from the respective radio access network entities. Such a switch of association would however require some signaling to update context state information maintained in the network. The deployment of overlapping pool areas introduces some kind of hysteresis for this kind of procedure avoiding the need for frequent updating of the context state information.

Another aspect for configuring overlapping pool areas is the possibility to separate the overall load according to different terminal moving pattern, e.g. considering multiple pool areas where each covers a separate residential area and all cover the same city centre (see for example 3GPP TS 23.236, "Intra-domain connection of Radio Access Network (RAN) nodes to multiple Core Network (CN) nodes", version 6.3.0, available at http://www.3gpp.org and being incorporated herein by reference).

Traditionally (also in 3GPP SAE/LTE systems), the cellular networks are split into a control plane (also denoted C-plane) handling all control information and procedures, and a user plane (also denoted U-Plane) handling the actual user data traffic, which also applies for the multicast architecture. The invention assumes that the multicast control plane can be handled by all core network control plane entities, which are assigned to the mobile terminals during network attachment or mobility. With respect to the SAE/LTE system the Mobility Management Entity (MME) performs the core network control plane functionality. For exemplary purposes all MMEs that also contain multicast management functionality may be referred to as a Multicast-MME (M-MME). On the other hand, for the SAE/LTE system the core network user plane functionality is contained in the User Plane Entity (UPE). It is assumed that at least one UPE provides user plane functionality for a multicast service and may be referred to as a Multicast-UPE (M-UPE), if it is selected by an M-MME to handle the multicast service data. Further, depending on the pool area size and/or MME(s)/UPE(s) capability, at least one M-UPE per pool area may be selected for a multicast service.

From the perspective of a mobile terminal, the M-MME is the same MME as assigned during network attach or mobility. However, it may be possible that the M-UPE serving pointto-multipoint (p-t-m) services is different from the UPE assigned for point-to-point (p-t-p) services. Despite this, for multicast services there is no direct relation between the mobile terminal and the M-UPE, i.e. the terminal does not maintain a user plane bearer to the M-UPE. In fact, the multicast service data is delivered from the M-UPE to the access nodes (eNodeBs), which broadcast the data to all mobile terminals present in their respective service area. E.g. IP multicast transport may be utilized in the network between the M-UPE and access nodes for transmission of the multicast service data.

An exemplary communication system is shown in FIG. 1 being composed of several pool areas 111, 121, 131, which respectively overlap each other. It is assumed that there are one or more access nodes (eNodeBs 114, 1115) assigned to only Pool Area 1 111, one or more access nodes (eNodeB 116) assigned to Pool Area 1 111 and Pool Area 2 121 simultaneously, and one or more access nodes (eNodeB 124) assigned to Pool Area 2 121. Similarly, eNodeB 125 belongs to Pool Area 2 121 and to Pool Area N 131. As apparent from FIG. 1, those access nodes 116, 125, located in the overlapping areas of two neighbouring pool areas, have direct connectivity to the core network entities of both pool areas. On the other hand, eNodeBs 114, 115, 124, 134 that are not located in the overlapping regions only have direct connectivity to the core network entities of their corresponding pool area.

It may be further assumed for exemplary purposes that the core network entities, i.e. the mobility management entities and the user plane entity of a respective pool area are interconnected via interfaces for communication and signaling. Further, the core network entities may also be connected to the different access nodes assigned to each pool area. For simplicity, FIG. 1 shows that a multicast service is provided via a single user plane entity 113, 123, 133 in a respective pool area. However, it is of course also possible to have more than one user plane entity providing multicast service data to the respective access nodes (here eNodeBs) of a pool area in order to have redundancy in the network. Similarly, only one MME 112, 122, 132 is assumed to be located in each pool area, though the provision of more mobility management entities per pool area is feasible and probable. For exemplary purposes a BM-SC 101 (Broadcast/Multicast Service Center) is shown, which could be the source of the multicast service to be provided to mobile terminals in the pool areas.

Moreover, for a better understanding of the invention the following paragraphs outline the procedures and steps for starting and terminating a multicast service in a communication system as also applicable to several embodiments of the invention described herein. Provision of multicast services typically comprises several phases, like subscription and service announcement, joining, session start and data transfer. Also for the termination of multicast services several phases can be identified, like session stop and leaving. From these phases, subscription, joining and leaving are typically performed individually per user. The other phases are typically performed on a service basis, i.e. for all users interested in the related service.

The subscription establishes the relationship between the user and the service provider, which allows the user to receive the related multicast service offered by the operator. The service announcement is used to distribute to users information about the service, parameters required for service activation (e.g. IP multicast addresses) and possibly other service related parameters (e.g. service start time).

The joining is part of the service activation phase by which a subscriber joins (becomes a member of) a multicast group, i.e. the user indicates to the network that he/she wants to to receive a specific multicast service. The user and/or UE choose the joining time possibly in response to a service announcement. This can be any time before, during or after the actual start of the multicast service. In case the service activation phase happens before the service start, this typically deploys relevant registration information in the network and reserves required resources without actually allocating them.

Finally, session start is the point at which the multicast service data is ready to be sent. As indicated above, session start might occur independently of service activation by the users. It is the trigger for resource allocation and establishment in the network, i.e. comprising core network and radio network resources. Subsequently, the multicast service data can be transmitted to the users.

Complementary, session stop is the point of time at which there will be no more data sent for the multicast service. It triggers release of previously allocated resources in the network. The leaving is the process by which a subscriber leaves (stops being a member of) a multicast group, i.e. the user no longer wants to receive a specific multicast service.

During the time in which the service is provided to the subscribers, the mobile terminals may move away from the location at which the service initially started, and eventually leave the pool area. FIG. 2 illustrates the communication network and the corresponding user-plane connections necessary for ensuring service continuity of a service for the mobile terminal.

In particular, the service is at first started and provided to the mobile terminal 102 in Pool Area 1 111. Therefore, a user-plane is established between the mobile terminal and the service provider, SM-SC 101, via M-UPE 113, various routers 117 and access node 115 in Pool Area 1 111. As the mobile terminal is moving, it will eventually leave Pool Area 1 111 and enter Pool Area 2 121. In case only one UPE per multicast service per service area is used, the service data is forwarded by the M-UPE 113 of Pool Area 1 111 to the new M-UPE 123 of Pool Area 2 121. In turn, the service data is then provided to the mobile terminal 102 via routers 127 and access node 124 of Pool Area 2 121. Similarly, upon the mobile terminal 102 changing again the pool area from Pool Area 2 121 to Pool Area N 131, the service data is further forwarded from M-UPE 123 to the new M-UPE 133 of Pool Area N 131. The mobile terminal 102 then receives the multicast service in Pool Area N 131 via routers 137 and access node 134.

As apparent from FIG. 2 the path lengths necessary to provide the mobile terminal 102 with the multicast service are continually increasing due to the movements of the mobile terminal 102 to neighbouring pool areas. Accordingly, data delays for the provided service increase as well, thereby complicating the delivery of synchronised data to multicast users.

Furthermore, the re-assignment of entities in the core network, e.g. UPE, to the mobile terminal can occur only after the mobile terminal moves to the new pool area, since the mobile terminal has to provide the network resource identifier to the RAN once it moves to the new pool area. On the other hand, static assignment requires an exceeding amount of effort and maintenance of databases at the core network entities, thereby reducing the flexibility of re-locating to a possible better entity as well.

SUMMARY OF THE INVENTION

In view of the above problems of the state of the art, the object of the invention is to provide an improved handover procedure for mobile terminals between overlapping pool areas in a network.

The object is solved by the subject matter of the independent claims. Advantageous embodiments of the invention are subject-matters of the dependent claims.

According to an aspect of the invention, a method for managing mobility of a mobile terminal receiving a multicast service from a service provider via a first access node is provided. The first access node is assigned to a first and at least a second pool area simultaneously, while the multicast service is provided between the service provider and the first access node via a first user plane entity of the first pool area. After the mobile terminal connects to the first access node, information is requested from the service provider about user plane entities in the at least second pool area. Additionally, a second user plane entity in the at least second pool area is arbitrarily selected, after completing an access node change of the mobile terminal from the first access node to a second access node in one of the at least second pool area. Subsequently, the user plane entity, via which the multicast service is provided between the service provider to the second access node, is changed from the first user plane entity in the first pool area to the arbitrarily selected second user plane entity in the one of the at least second pool area.

According to an embodiment of the invention, the mobile terminal is served by a mobility management entity, which conducts the requesting of information, the arbitrary selection and the change of user plane entity.

Moreover, according to a different aspect of the invention, the arbitrary selection is conducted as soon as the mobile terminal connects to the first access node and before information is requested from the service provider about user plane entities in the at least second pool area.

In a variation of the invention a connection complete message, comprising an identifier of the at least second pool area, is transmitted from the mobile terminal or the first access node to the mobility management entity upon connection of the mobile terminal to the first access node. In addition, the mobility management entity identifies the first access node as being assigned to at least two pool areas simultaneously, based on the connection complete message.

Another aspect of the invention relates to the connection complete message being transmitted from the mobile terminal or the first access node to the mobility management entity via the first user plane entity.

According to an advantageous embodiment of the invention, the request to the service provider further comprises information about the arbitrarily selected second user plane entity in the at least second pool area. Consequently, the service provider is able to prepare for the actual handover by reserving resources for the transmission of service data to the new pool area, without actually allocating same.

According to an advantageous aspect of the invention, the requested information about the user plane entities in the at least second pool area comprises information about which user plane entities are serving the multicast service in the at least second pool area. The mobility management entity is thus enabled to confirm or adapt the selection of the prospect second user plane entity in advance.

Moreover, in another embodiment of the invention the arbitrary selection of the second user plane entity further comprises an adaptation of the arbitrary selection of the second user plane entity according to the requested information about which user plane entities to are serving the multicast service in the at least second pool area. The selection is thus optimized in view of the particular pool area and regarding already provided services, thereby possibly saving resources in the new pool area.

In particular, according to a more specific embodiment of the invention, the arbitrarily selected second user plane entity is confirmed in case no user plane entity is serving the multicast service in the at least second pool area. Further, in case at least one user plane entity is serving the multicast service in the at least second pool area, one of the at least one user plane entity serving the multicast service in the at least second pool area is selected arbitrarily as the second user plane entity.

According to a further aspect of the previous embodiment of the invention, when the user plane entity via which the multicast service is provided is changed, the service provider is informed about the adapted arbitrarily selected second user plane entity. Thus, the service provider knows to which user plane entity in the new pool area he needs to send service data to.

In an additional embodiment, when the user plane entity via which the multicast service is provided is changed, service context data is transmitted to the adapted arbitrarily selected second user plane entity, comprising information about the multicast service. Thereby, the new UPE is efficiently furnished with the necessary information to handle the user plane in the new pool area for providing the service data to the second access node. It might be also possible to transmit information about the mobile terminal along with the multicast service information to the second user plane entity.

According to another aspect of the invention, in case the one of the at least one user plane entity serving the multicast service in the one of the at least second pool area is selected as the second user plane entity, the second user plane entity transmits the private IP multicast address utilized by the second user plane entity, for providing the multicast service, to the mobility management entity, upon receiving the service context data. In the other case that no user plane entity in the one of the at least second pool area is serving the multicast service and the arbitrarily selected second user plane entity is confirmed, the second user plane entity acquires a private IP multicast address and transmits the acquired private IP multicast address to the mobility management entity, upon receiving the service context data.

According to an advantageous embodiment of the invention, upon receiving the private IP multicast address or the acquired private IP multicast address of the second user plane entity, the mobility management entity transmits an identifier of the multicast service and the private IP multicast address or the acquired private IP multicast address of the second user plane entity to the second access node. Thus the second access node may join the service provided by the second user plane entity.

In view of an additional aspect of the invention, the second user plane entity transmits an identifier of the multicast service and the private IP multicast address to the second access node, after receiving the service context data, in case the one of the at least one user plane entity serving the multicast service in the one of the at least second pool area is selected as the second user plane entity. Further, in case no user plane entity in the one of the at least second pool area is serving the multicast service and the arbitrarily selected second user plane entity is confirmed, the second user plane entity sends an identifier of the multicast service and the private IP multicast address to the second access node, after acquiring the private IP mrulticast address. This is advantageous compared to the previous embodiment, as the message to the management mobility entity of the first pool area is not necessary.

According to a further embodiment of the invention, the arbitrary selection is conducted after requesting from the service provider information about user plane entities in the at least second pool area. Compared to the previous embodiments, no adaptation of the arbitrary selection is necessary, as the information about user plane entities in the at least second pool area is already available at the selection time.

In a still different aspect of the invention, the arbitrary selection is conducted after completing the access node change from the first access node to the second access node in the one of the at least second pool area. The selection is more efficient, as it may be restricted to only the one pool area to which the mobile terminal has actually moved.

According to an embodiment of the invention, a mobility management entity of a first pool area serving a mobile terminal to receive a multicast service from a service provider via a first access node is suggested. In particular, the first access node is assigned to the first and at least a second pool area simultaneously, and the multicast service is provided between the service provider and the first access node via a first user plane entity of the first pool area. The mobility management entity comprises a transmitter for transmitting a request to the service provider for information about user plane entities in the at least second pool area. This message is transmitted after receiving via a receiver information about a connection of the mobile terminal to the first access node. A processor is provided in the mobility management entity for arbitrarily selecting a second user plane entity in the at least second pool area. The receiver is further adapted to receive a notification about the mobile terminal changing from the first access node to a second access node in one of the at least second pool area. In addition, the transmitter is further adapted to transmit a change notification to the service provider and to the arbitrarily selected second user plane entity for changing the user plane entity, via which the multicast service is provided between the service provider to the second access node, from the first user plane entity in the first pool area to the arbitrarily selected second user plane entity in the one of the at least second pool area.

According to an embodiment of the invention, a user plane entity for providing a multicast service for a mobile terminal between a service provider and a first access node in a first pool area is provided. The first access node is assigned to the first and at least a second pool area simultaneously and the user plane entity comprises means to perform or to participate in the steps of the method according to one of the method claims.

According to an embodiment of the invention, a service provider for providing a multicast service to a mobile terminal via a first access node is suggested. The first access node is assigned to a first and at least a second pool area simultaneously, and the multicast service is provided between the service provider and the first access node via a first user plane entity of the first pool area. Furthermore, the mobile terminal is served by a mobility management entity, wherein the service provider comprises a receiver for receiving a request from the mobility management entity, for requesting information about user plane entities in the at least second pool area. A transmitter within the service provider is utilized for transmitting said information about user plane entities in the at least second pool area to the mobility management entity.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Figure 1:
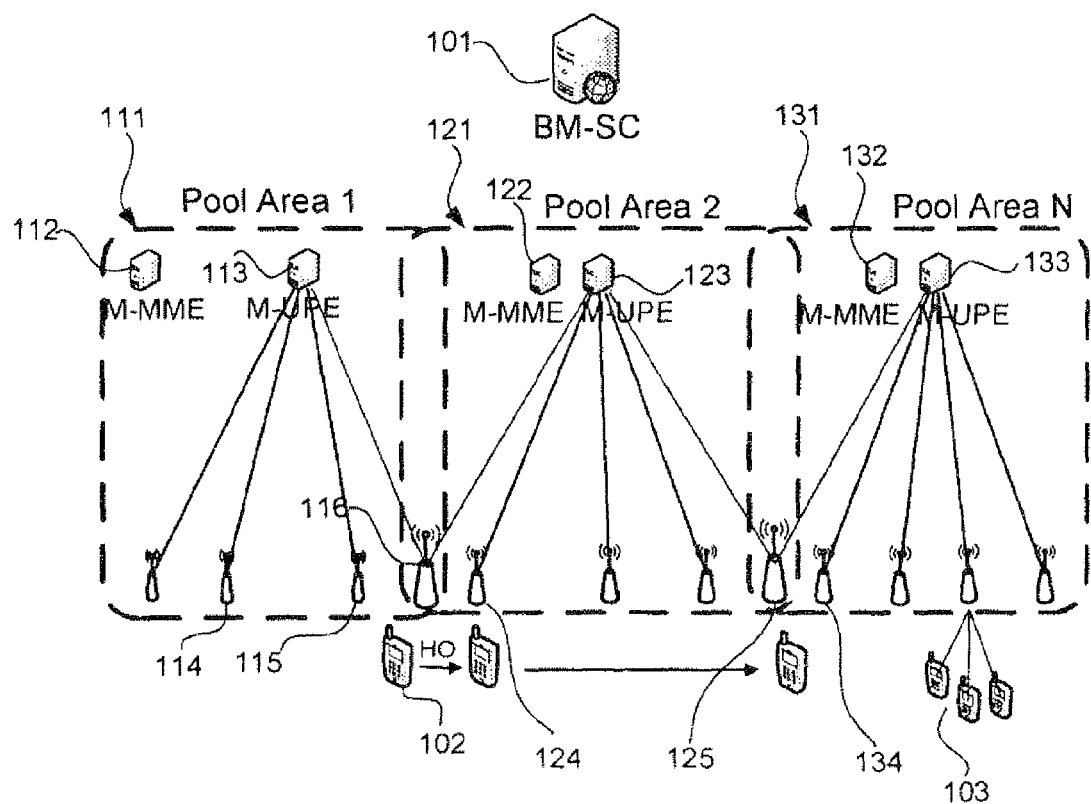
FIG. 1 shows an exemplary network architecture with overlapping pool areas.
Figure 2:
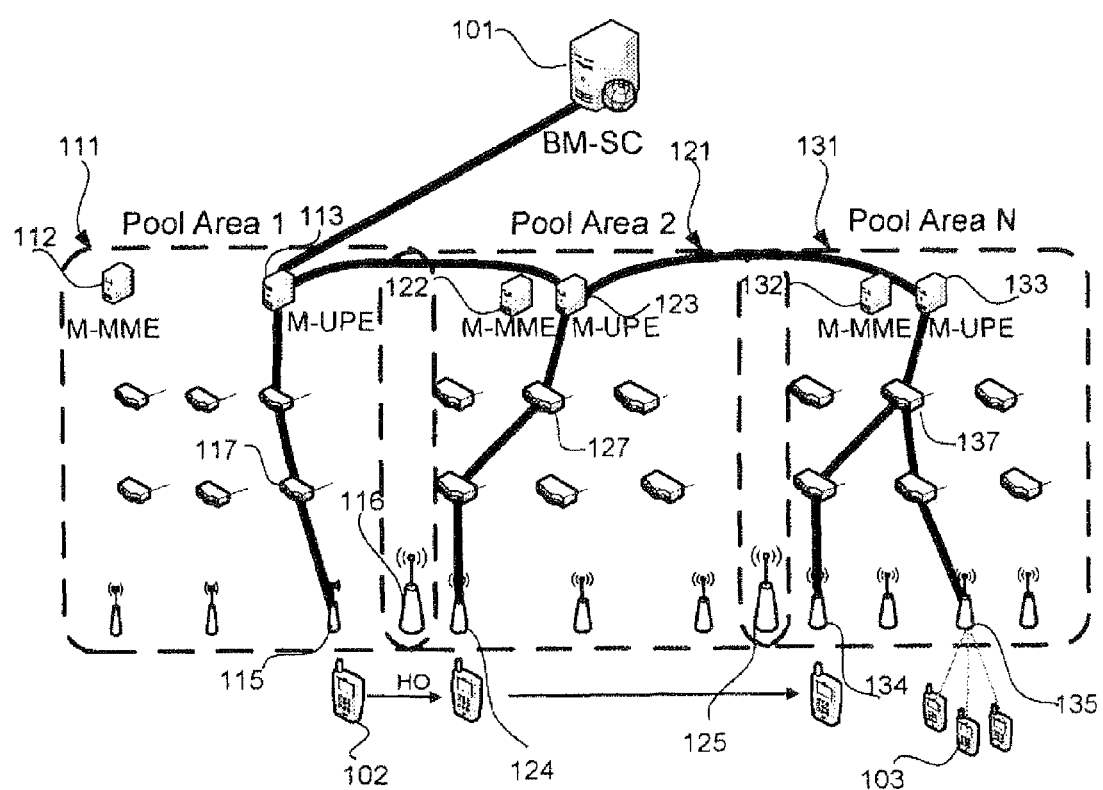
FIG. 2 shows the network architecture of FIG. 1, wherein a service is provided by a BM-SC while the served mobile terminal is moving to neighboring pool areas.

The following paragraphs will describe various embodiments of the invention. For exemplary purposes only, most of the embodiments are outlined in relation to an (evolved) UMTS communication system according to the SAE/LTE discussed in the Background Art section above. It should be noted that the invention may be advantageously used for example in connection with a mobile communication system such as the SAE/LTE communication system previously described, but the invention is not limited to its use in this particular exemplary communication network.

The explanations given in the Technical Background section above are intended to better understand the mostly SAE/LTE specific exemplary embodiments described herein and should not be understood as limiting the invention to the described specific implementations of processes and functions in the mobile communication network. Nevertheless, the improvements proposed herein may be readily applied in the architectures/systems described in the Technological Background section and may in some embodiments of the invention also make use of standard and improved procedures of theses architectures/systems.

In one embodiment of the invention the pool area corresponds to a tracking area. A tracking area is typically used to efficiently support terminal mobility in idle mode. In this embodiment the mobility management entities in a pool area are expected to require mapping information between tracking area IDs and cells in this tracking area for a particular geographical area. In other words, a pool area might comprise one or more tracking areas, but a mobility management entity may know which tracking areas belong to its own pool area.

Further, an access node may be considered an entity in the access system of a communications network to which mobile terminals attach. One exemplary embodiment of the invention relates to mobile communication systems, where the access nodes may be base stations or NodeBs (denoted eNodeBs in the 3GPP-based SAE/LTE system). In another embodiment, an access node may also denote an access point of a WLAN system.

A user plane may be understood as an established path between two network entities in a communication system for transmitting data (unidirectional or bidirectional). Typically, the user plane is assigned an identifier that allows a network node to distinguish different user planes. Optionally, there may be context information for a user plane established at the network nodes that include supplementary information on the user plane. In one exemplary embodiment related to a 3GPP based communication system, the user plane is typically established between a base station (or Node B) and a user plane entity. It carries the actual user data of the service requested by the user and is typically associated to some Quality-of-Service (QoS) parameters, e.g. depending on the service or the user subscription. In one exemplary embodiment of the invention it might be based on IP Multicast transport between the access nodes (base stations) and the user plane entity.

The embodiments of the invention are based on the premise that one access node is assigned to at least two pool areas, that is that neighboring areas overlap each other with at least one access node in the overlapping area. One aspect of the invention is to enable an improved handover procedure by utilizing the access node in the overlapping area for preparing the actual handover. In particular, as soon as the mobile terminal moves to the access node in the overlapping area, necessary information for a handover is exchanged between the network entities in order to prepare for the actual handover to the next pool area. After the actual handover, the serving UPE of the mobile terminal is relocated to a new UPE of the next pool area, which is selected arbitrarily. This may be conducted in a fast way as the actual handover to the new pool area was foreseen and has thus been prepared in advance.

Figure 3:
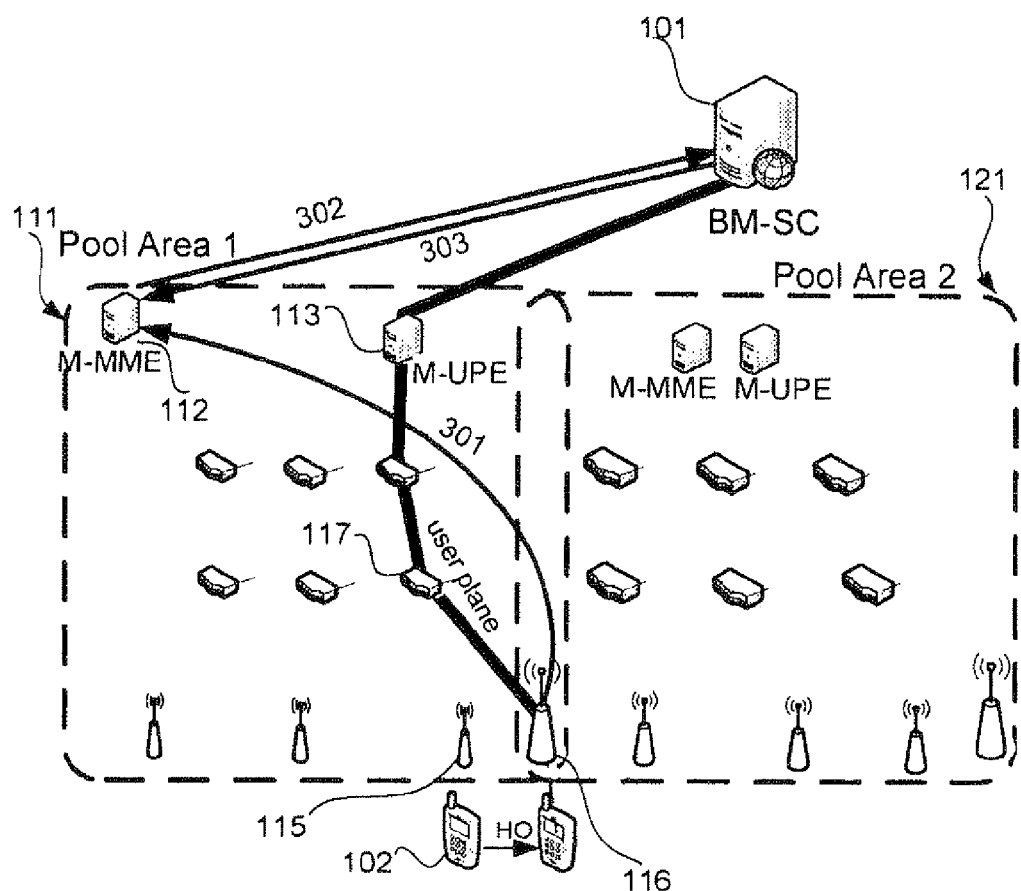
FIG. 3 shows a network architecture, in which the first part of a message exchange for a handover method is illustrated according to one embodiment of the invention.
Figure 5:
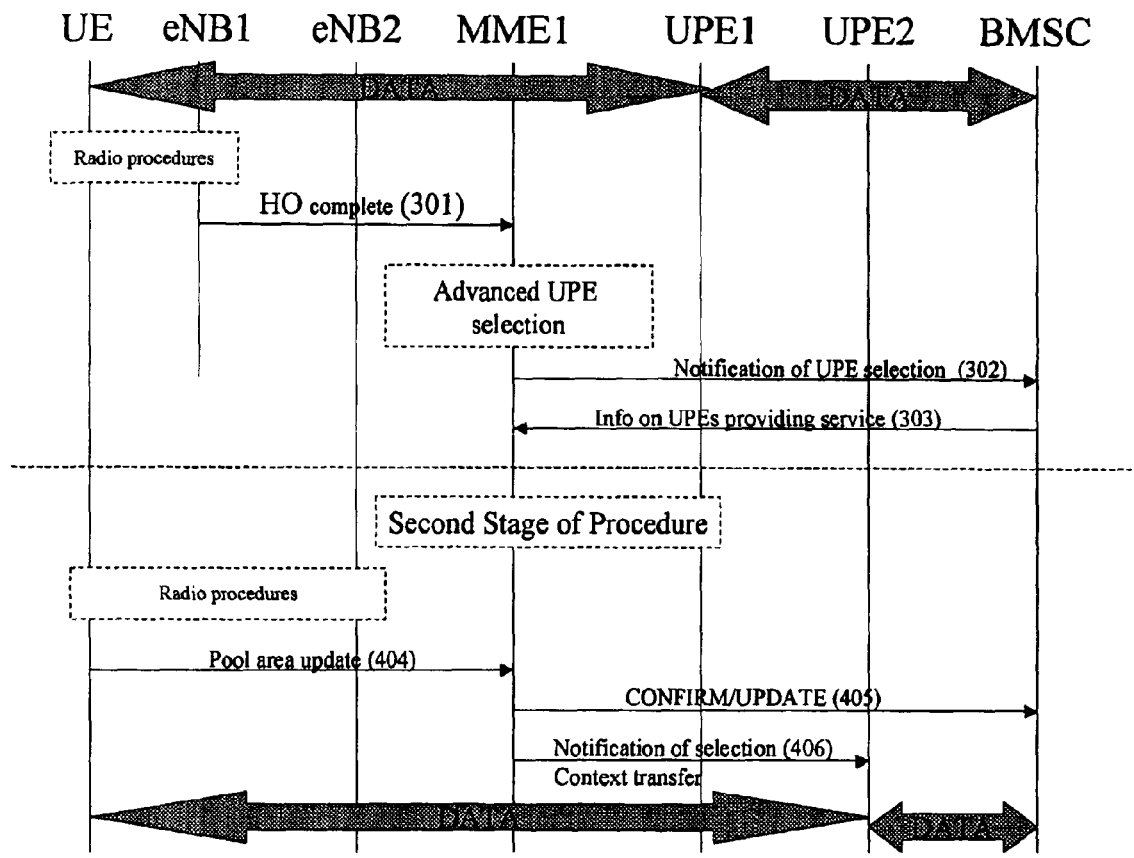
FIG. 5 shows a signal diagram for the handover method according to one embodiment of the invention.

The embodiments of the invention may be generally divided into two phases/stages, one before and one after the actual handover. FIG. 3 shows a network architecture in which the first stage of the improved handover procedure is illustrated according to one embodiment of the invention. FIG. 5 shows a signal diagram of the complete handover procedure according to the one embodiment of the invention, comprising both stages of the procedure. A service provider, BM-SC 101, provides a service, which the mobile terminal 102 has joined previously. In accordance therewith, M-MME 112 serves as the control plane entity, and M-UPE 113 handles the user plane for the service within Pool Area 1 111. The mobile terminal moves between the various cells of the pool area, each cell being provided by one access node. It should be however noted that several access nodes may be allocated per cell as well, depending on the logical areas assigned by the operator.

We assume that the service is currently being provided by access node 115, which happens to be the last access node solely belonging to Pool Area 1 111. Eventually, the mobile terminal 102 moves to the next access node 116, that is still located in Pool Area 1 111, but belongs to Pool Area 2 121 as well. Consequently, the mobile node 102 sends a handoff complete message 301 to the mobility management entity 112, informing the M-MME 112 about the successful handoff to the new access node. The handoff completion message 301 may also be transmitted by the access node 116 instead of the mobile terminal 102. The handoff completion message is usually only transmitted in case the mobile terminal is in LTE_Active mode, as is the case when a mobile terminal is currently receiving a service. A mobile terminal in IDLE mode does normally not transmit any handoff complete notifications to the serving MME, because it is of no importance to the MME to which cell the mobile terminal is currently attached. In IDLE mode only the pool area is relevant for the MME in order to be able to page the mobile terminal.

The mobility management entity 112 then receives the handoff completion message from the access node 116, and is able to identify the access node as an access node that belongs to several pool areas simultaneously. In this respect, the handoff completion message 301 comprises an identifier that indicates the assignment of the access node 116 to Pool Area 1 111 and Pool Area 2 121 at the same time. It may also be possible that for each pool area to which an access node is assigned, one identifier is provided in the handoff completion message. Alternatively, the M-MME 112 could be pre-configured with network information about available UPEs in the pool areas of the network. When deploying a base station (denoted also eNodeB or access node), the base station is typically configured with network information that are required for its proper use. This configuration may for example include information about the topological areas to which the base station might belong (e.g. pool area(s)/tracking area(s)) and the network nodes contained in theses areas and to which the base station may maintain an interface. In other words the base station may map a topological area, e.g. tracking area or pool area, to node identifiers, e.g. identifiers of the mobility management entities or user plane entities or other base stations, in this area and vice versa.

The handoff completion message 301 may also be first transmitted to the UPE 113 in the Pool Area 1 111, which in turn forwards the message 301 to the MME 112.

The M-MME 112, upon receiving the handoff complete message 301 and recognizing the access node 116 as one belonging to at least two pool areas, arbitrarily selects a UPE in the new Pool Area 2 121, which is deemed to serve the mobile terminal when same actually moves to the new Pool Area 2 121. Though FIG. 3 only shows one UPE per pool area, this however being only for illustrating and explanatory purposes, several UPEs in one pool area are usually foreseen in order to distribute the load. The random pre-selection is done with the objective of optimizing the route between the BM-SC 112 and the UE 102. Firstly, the MME 112 will select an M-UPE in the next pool area by utilizing the pool area ID reported by the eNodeB 116 with the handoff completion message 301. Secondly, the selection may alternatively take into consideration any other parameter that is deemed necessary to optimize the load, route etc., wherein possible examples are load balancing or required quality of service. Depending on how the network is configured, the M-MME 112 could know the IP prefixes of those m-UPEs in the pool areas of the network that are multicast capable (if not all are capable). Subsequently, the MME 112 could then select at random one UPE in the new pool area among those UPEs that are multicast-capable and additionally according to the optimization parameters required. If there are any limitations on the number of UPEs that can serve as M-UPE, the M-MME 112 can limit its scope of selection to this limited number of UPEs, which could be configured with a different prefix. That is, in case not all UPEs in the new Pool Area 2 121 are multicast-enabled, the arbitrary selection is restricted to only those that are enabled to provide a multicast service.

Furthermore, in case more than two pool areas are assigned to one access node in an overlapping area (not shown), one multicast-enabled UPE is arbitrarily selected for each pool area. Nevertheless, in order to simplify the description, only two overlapping areas are assumed in the following. The handover procedure according to the embodiment of the invention however also applies to an overlapping of more than two pool areas.

Once the MME 112 has selected the prospect UPE in the new Pool Area 2 121, which in the example of FIG. 3 is M-UPE 123, the BM-SC 101 is notified in this respect by the M-MME 112. That is, the MME 112 transmits a message 302 to the BM-SC 101 including the identification of the arbitrarily selected UPE in the new Pool Area 2 121. The message 302 further includes the TMGI of the service, so that the BM-SC 101 knows to which service the message is related to. The BM-SC 101 may now reserve necessary resources in advance for the later change of UPE, which reduces the time for the actual switching in the future, as the reserved resources then only have to be allocated to finalize the UPE re-location during handover.

The BM-SC 101 receives said message 302 and is able to identify all UPEs that are handling the service, identified by the TMGI, that was received in message 302 from the MME 112. Subsequently, the BM-SC 101 responds with a complete list 303 of all UPEs that are currently serving the corresponding service, possibly comprising some UPEs in the new Pool Area 2 121. Thus, the MME 112 is enabled to control/adapt the arbitrary selection of the prospect UPE in regard to UPEs in Pool Area 2 that are already providing said service. Alternatively, as the SM-SC 101 receives the identification of the selected UPE in the new Pool Area 2 121, he can infer from the identification which particular pool area(s) are relevant to the MME 112. Consequently, the BM-SC 101 could also respond to the MME 112 with a restricted list 303 of only those UPEs serving the service in the relevant pool area(s).

In case the service is currently not being provided in Pool Area 2 121, the arbitrarily selected UPE of the new Pool Area 2 121 may be confirmed in advance. In the other case in that any number of UPEs are already serving mobile terminals with the service, the arbitrarily selected UPE should be one that already serves said service in order to re-use available resources. Therefore, if the arbitrarily selected UPE is by chance one of the UPEs already serving the service, the selection may be confirmed. However, if the selected UPE is not one of the UPEs already serving the service in the new pool area, then the selection has to be adapted. That is, among those UPEs that already transmit the multicast service data to subscribed mobile terminals, one is arbitrarily selected as being the prospect UPE in the new Pool Area 2 121 for the mobile terminal 102, which is still attached to the access node 116 in the overlapping area.

However, the selection is not yet finalized, because it is not definite that the mobile node will indeed move to the new Pool Area 2 121. The mobile terminal 102 could stay within the overlapping area while moving along the border to the new Pool Area 2 121 without ever entering Pool Area 2 121. Similarly, the UE 102 could also move back out of the overlapping area but remain in Pool Area 1 111. Also, in case there are more than two overlapping pool areas, it is not foreseeable to which pool area the mobile terminal will actually move, as there are several possibilities. Hence, the next steps of the procedure according to one embodiment of the invention may only be conducted once the mobile terminal 102 has indeed moved into the new pool area.

Figure 4:
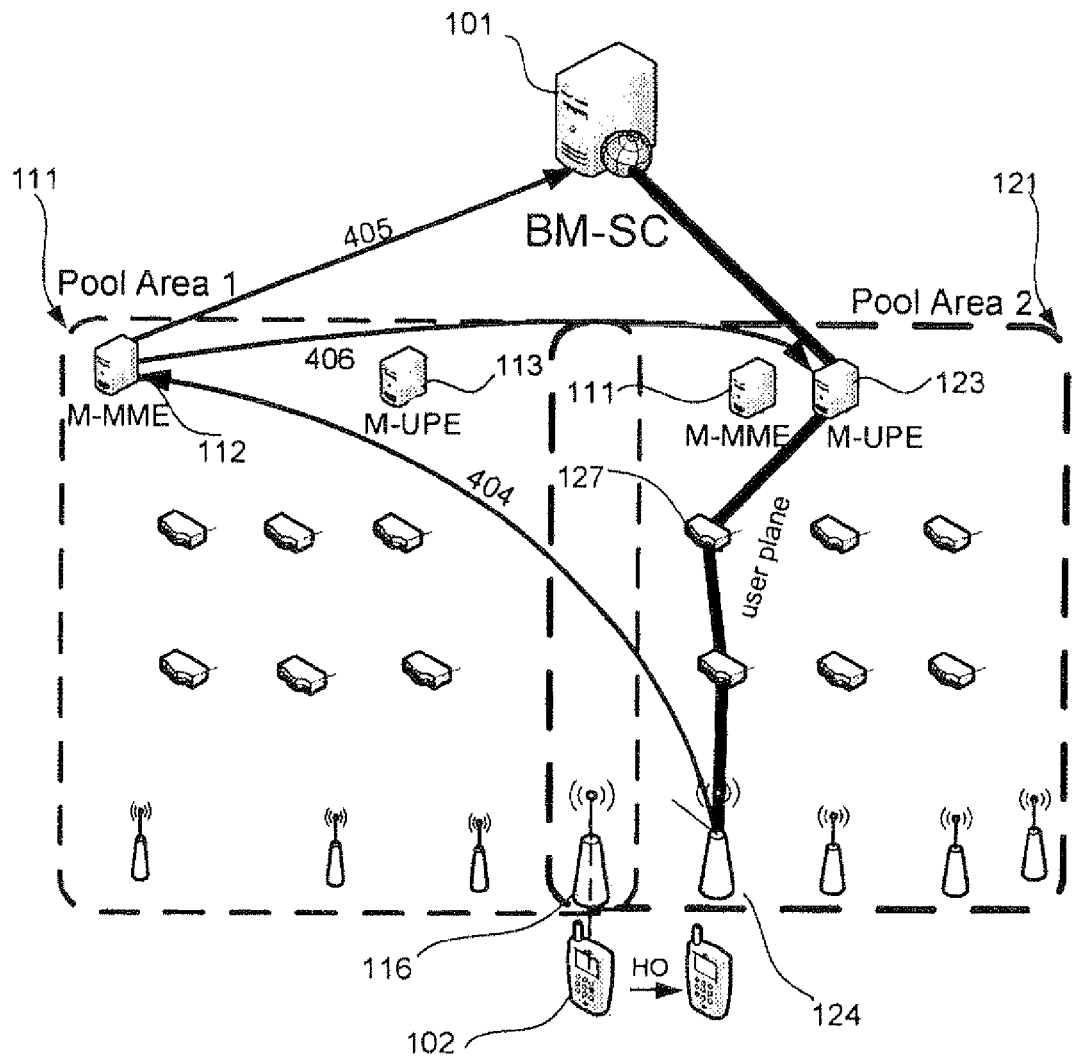
FIG. 4 shows a network architecture, in which the second part of a message exchange for a handover method is illustrated according to one embodiment of the invention.

Eventually, the mobile terminal 102 will trespass the border to the new Pool Area 2 121, thus triggering a pool area handover. FIG. 4 shows the network architecture and message exchange for the second phase of the handover procedure, which generally comprises the actual handover to the new pool area. The second stage of the procedure is also illustrated in the signal diagram of FIG. 5.

In particular, short after the mobile terminal 102 moves out of the overlapping area into the Pool Area 2 121, the UE 102 attaches to a new access node 124. The access node 124 identifies the UE 102 as a new UE within the Pool Area 2 121 by utilizing the identification of the mobile terminal. Similarly, the UE 102 identifies that it has moved to a new pool area by checking the identification information provided on the broadcast channel of the new cell. compares it to the identification information it has stored. If the identification information of the new cell is different to the identification information it has stored for the previous cell, then the pool area update is transmitted from the UE.

After completing the access node change from access node 116 of the overlapping area to the access node 124 of Pool Area 2 121, a pool area update message 404 is transmitted to the M-MME 112, in order to inform same about the completion of the pool area change of the mobile terminal 102. The message 404 may be sent from the new access node 124 or from the mobile terminal 102. In case there is no direct Si interface from the access node 124 of Pool Area 2 121 to the MME 112 of Pool Area 1111, the pool area update message 404 may go through the backbone of the network so as to reach the M-MME 112 in Pool Area 1 111. Alternatively, the message 404 may be transmitted first from the new access node 124 to the old access node 116 in the overlapping area via the X2-interface, and then forwarded by the access node 116 to the M-MME 112. The x2-interface provides connectivity for a access node to neighboring access nodes.

Naturally, the pool area update message 404 comprises an identifier of the new Pool Area 2 121, which can be used by the MME 112 to finalize the selection of the UPE in the Pool Area 2.

This may also include notifications to the BM-SC 101 in order to cancel the reservations for resources for pool areas that are not relevant any more. In particular, previously the BM-SC 101 was informed about an arbitrarily selected UPE for each pool area of the overlapping pool area part. Accordingly, the BM-SC 101 can reserve some resources for each pool area in order to later establish the communication, without actually allocating same. After the UE 102 moves to a particular pool area, the remaining pool areas are not relevant anymore and should be discarded. Thus the M-MME 112 upon receiving the pool area update message 404 may indicate to the BM-SC 101 to release the resources reserved for said remaining irrelevant pool areas. This indication may be comprised within a notification 405, for actually switching the UPE (see below). Alternatively, the BM-SC 101 could infer this also from the switching notification 405.

More specifically, as the UE 102 now has moved to Pool Area 2, the M-MME 112 must decide whether the arbitrarily selected UPE of Pool Area 2 is to be confirmed as the prospect UPE, or whether it has to be adapted.

As already mentioned above in regard to the requested information about UPEs in Pool Area 2 121 already serving the service, in case no UPE is currently providing the service in Pool Area 2 121, the arbitrarily selected UPE is confirmed by the M-MME 112 as being the new serving UPE for the UE 102 in Pool Area 2 121.

However, should at least one UPE in the Pool Area 2 already be serving the multicast service, it may become necessary to change the arbitrarily selected UPE. Specifically, in case there are already UPEs serving the multicast service in the new pool area, said UPEs should be used for the UE 102 as well, rather than registering a new UPE for it. Therefore, if the arbitrarily selected UPE is by coincidence one of the serving UPEs in the new Pool Area 2 121, the selection may be confirmed. On the other hand, if the arbitrarily selected UPE is not one of the serving UPEs in the new Pool Area 2 121, the MME arbitrarily selects one of the serving UPEs and changes the selection from the previously arbitrarily selected UPE to the new adaptively selected UPE.

Resulting from the above, the M-MME 112 has finally decided which M-UPE to use in Pool Area 2 121 for the mobile terminal 102. In accordance therewith, the MME 112 now informs the BM-SC 101 as well as the finally selected M-UPE 123 about the decision. In this respect, the BM-SC 101 receives an update message 405 from the MME 112 and transmits service data for the UE 102 to M-UPE 123 of Pool Area 2 instead of to M-UPE 113 of Pool Area 1.

Additionally, the M-MME 112 transmits a message 406 to the new M-UPE 123 comprising the service context for the mobile terminals 102, which includes the MBMS service parameters (identifier, QoS, etc.) that are going to be relocated. Additionally, the message 406 may include information about the mobile terminal or any possible ciphering or encryption information if the service is one that requires or uses this features. Thus, the UPE 123 in the second Pool Area 2 121 knows that the mobile terminal 102 is registered to the multicast service, and multicast service data from the SM-SC 101 is then forwarded by the UPE 123 to the UE 102. Consequently, the new user plane for UE 102 is allocated between the new UPE 123 and the new access node 124, via several routers 127 in the core network of Pool Area 2 121, as apparent from FIG. 4.

It should be however noted, that the actual transmission of service data to UPEs in Pool Area 1 121 and Pool Area 2 121 strongly depends on whether other mobile terminals in either Pool Areas 1 or 2 also are currently receiving the service. Accordingly, the BM-SC 101 might already be transmitting service data to the selected UPE 123 in Pool Area 2 121, in case other UEs in Pool Area 2 121 have been previously receiving the service and are still subscribed to the service. In such a case, the update message 405 from the MME 112 to the BM-SC 101 is not necessary, as the BM-SC does not need to know where the mobile terminal 102 is located. The UPE 123 of Pool Area 2 121 however still needs the service context and information about the UE 102 from the MME 112, which may be transmitted with message 406.

It might also be necessary for the new UPE 123 in the Pool Area 2 121 to configure a new private IP multicast address. The private IP multicast address is used to transport the service data through the backhaul (between the UPE 123 and the access node 124) by using multicast methods. Again, this depends on whether the finally selected UPE 123 has been previously providing the multicast service or not. In case the multicast service is not being provided in Pool Area 2 121 prior to handover of the mobile terminal 102, the UPE 123 needs to acquire a new private IP multicast address, e.g. in a similar manner to DHCP, after receiving the message 406. The multicast address allocation protocol (MADCAP) may be used in this respect. In the different case in that the service is already being provided in Pool Area 2 121, the UPE 123 already holds a private IP multicast address that is being used for transport of multicast service data.

Once the M-UPE 123 holds a private IP multicast address, the UPE 123 will respond (in both cases) to the notification of selection 406 by transmitting its private IP multicast address to the MME 112. The M-MME 112 in turn ran send a start/trigger message (not shown), including the identifier of the service (TMGI) and the private IP multicast address to the access node 124, so the access node 124 is triggered to join the IP multicast group that is used for transport of the service data, wherein the IP multicast group is specified by the private IP multicast address.

Alternatively, the M-UPE 123 in Pool Area 2 121 may inform the access node about the available service, wherein this would include the transmission of a corresponding start message to the access node 124. In this case, it would not be necessary that the UPE 123 responds to the selection notification 406 with the private IP multicast address.

It may be further necessary to de-register the UPE 113 of the old Pool Area 1 for the service, in case no other UEs are receiving the service in Pool Area 1 111 (not shown). In case UE 102 is the last UE receiving the service in the Pool Area 1 and UE 102 leaves the Pool Area 1 or it has sent a Leave (or de-registration message) to the M-MME, the M-MME 112 will indicate to the eNBs in the Pool Area 1 to leave the multicast tree used for transport of the service data. In addition, the M-MME 112 may also indicate to the UPE 113 to leave the service by direct indication to BM-SC 101 or by sending a Leave notification also for the service, in case multicast transport is also used between the SM-SC and the UPEs.

According to another embodiment of the invention, the arbitrary selection of the prospect UPE in the new pool area may be conducted at a different point in time, than upon receiving a handoff complete message 301 about an access node change to an access node in an overlapping area. In the case that the selection is not conducted upon reception of the handoff complete message 301, the message 302 to the BM-SC 101 is only a request message for requesting information about all UPEs providing the specific service. Naturally, compared with the above embodiment, the SM-SC 101 is not informed about the decided UPE in advance, and thus can not reserve resources therefore.

In particular, one alternative is to conduct the arbitrary selection after receiving the requested information about UPEs in the new Pool Area 2 121 with message 303. In this case the MME 112 knows from the message 303 whether the service is already being provided in the new Pool Area 2 121 or not. In case several M-UPEs in Pool Area 2 121 are already forwarding the service data to other mobile terminals, the M-MME 112 arbitrarily selects one of said M-UPEs as the prospect M-UPE for serving the mobile terminal 102 once it has entered the new Pool Area 2 121. Accordingly, in case the service is currently not provided in Pool Area 2 121, the M-MME 112 may arbitrarily select among any multicast-enabled UPEs in the new pool area. According to this embodiment of the invention, no adaptation of the selection is necessary later on, as the necessary information is already available at the point of the decision. When the UE 102 eventually changes to the new Pool Area 2 121, the MME 112 informs the BM-SC 101 (not necessary if UPS already provided service, see above paragraphs regarding necessity of message 405) and the selected M-UPE 123 about the decision, upon receiving the pool area update message 404.

In case that more than two pool areas overlap each other with the same access node 116 being in the overlapping area, the MME 112 can definitely decide for each pool area which M-UPE would be used as being the serving M-UPE for the mobile terminal 102. In accordance therewith, when the UE 102 finally enters one of the several pool areas, the MME 112 already possesses the information about the M-UPE that has been chosen for that pool area. Then, the MME 112 only has to inform the BM-SC 101 and the chosen UPE of that pool area about the decision, when it receives the information about the attachment of the mobile terminal to that pool area.

In still another embodiment of the invention the selection of the prospect UPE for the mobile terminal 102 may be conducted after that the mobile terminal 102 actually enters the new pool area. More specifically, the MME 112 holds the information about the UPEs in the all the pool areas that belong to the overlapping area of the access node to which the mobile terminal 102 is currently attached, because of the request message 302 that was sent to the BM-SC 101 upon attaching to said access node. Then, as soon as the MME 112 receives the pool area update message 404 from the access node 124 of the new pool area, the MME 112 decides which UPE will handle the service data for the mobile terminal 102. Similarly to the above embodiments, the decision for the UPE also depends on whether the service has been already provided to other mobile terminals in the new pool area. In case the service is already being provided in the new pool area by UPEs, the arbitrary selection is restricted to only among those UPEs. On the other hand, if no UPE provides the service in the new pool area yet, the MME 112 may arbitrarily select among all possible UPEs in the new pool area. Advantageously, the decision is easier compared to the previous embodiments, because the selection is always performed only one time for only one pool area.

Figure 6:
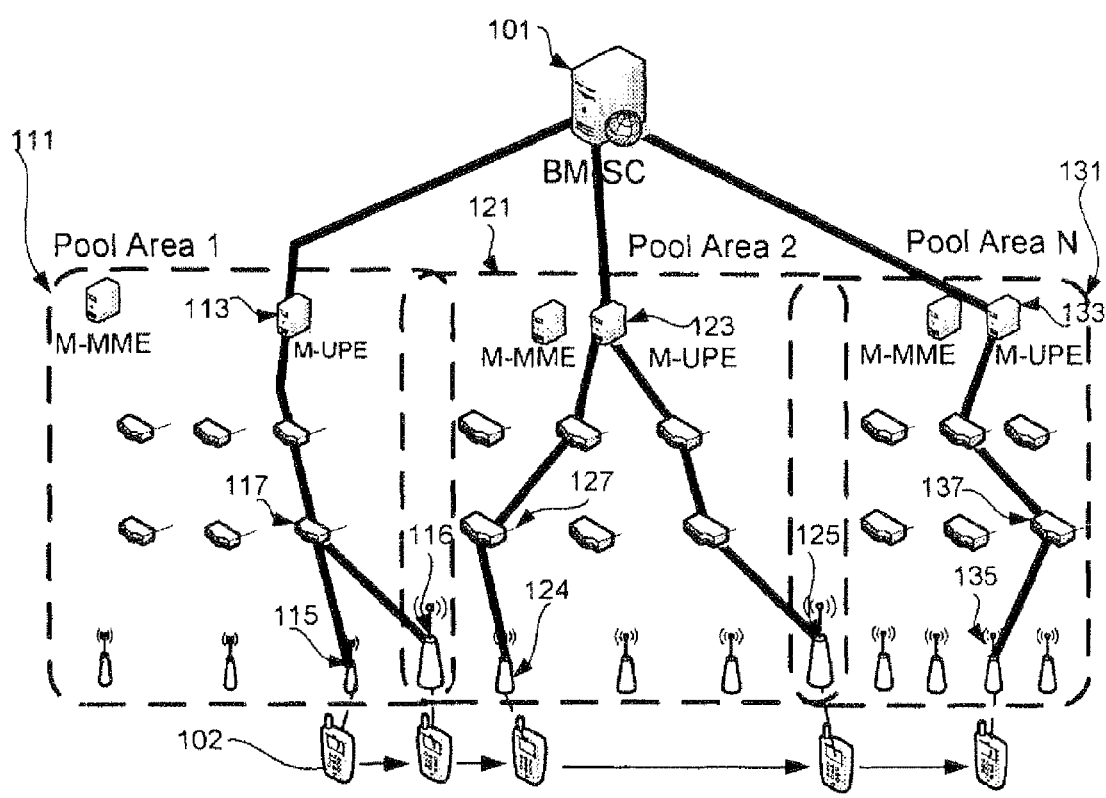
FIG. 6 shows a network architecture, wherein a service is provided while the served mobile terminal is moving to neighboring pool areas, after handover procedures according to the one embodiment of the invention.

FIG. 6 shows a network architecture with overlapping areas 111, 121, 131 in which a mobile terminal 102 moves from Pool Area 1 111 to Pool Area N 131, thereby utilizing the improved handover procedure suggested by one embodiment of the invention. In particular, FIG. 6 illustrates the different data paths from the service provider 101 to the mobile terminal 102 during the movement from one pool area to the next one.

At first, the mobile terminal 102 is attached to the access node 115 and receives the service data via M-UPE 113 and routers 117 of Pool Area 1 111. Upon changing the access node from access node 115 to access node 116 of the overlapping area, the first stage of one embodiment of the procedure is conducted. The mobile terminal keeps receiving the service data via M-UPE 113 and various routers 117 of the core network. Eventually, the mobile terminal moves into the neighboring Pool Area 2 121 and attaches to access node 124. Thereupon, the second stage of the handover procedure according to the one embodiment of the invention is completed, with the result that the serving M-UPE is re-located, that is changed, from M-UPE 113 of the Pool Area 1 111 to M-UPE 123 of the Pool Area 2 121. Accordingly, the UE 102 now receives the service data from the service provider 101 via the arbitrarily selected M-UPE 123 of Pool Area 2 121, via routers 127 of the core network in Pool Area 2 and via the access node 124.

Similarly, while the mobile terminal 102 moves on in direction to Pool Area N 131, an access node change to access node 125 in the overlapping area is effected, thereby triggering the improved handover procedure of one embodiment of the invention. In accordance with the above, the handover procedure of one embodiment of the invention is finalized one the mobile terminal enters the new Pool Area N, with the effect that the serving UPE is again re-assigned. M-UPE 133 of Pool Area N instead of M-UPE 123 is now serving the UE 102 with the service.

As apparent from FIG. 6, the respective data path lengths are substantially the same during the whole movement of the UE 102. Therefore, increasing data delays are avoided, and the synchronization of service data is facilitated.

The procedures illustrated according to the embodiments of the invention may also be applied to a mobile terminal that starts in an overlapping area of several pool areas. In said case the mobile terminal attaches to the access node in the overlapping area and registers to either one of the pool areas and its core network entities, M-MME and M-UPE, because there is no possibility to know in which direction the UE is about to move. In addition, as the M-MME identifies the access node as being one in an overlapping area, the first phase of one embodiment of the invention is then conducted. Depending on the specific embodiment of the invention used, this may comprise the arbitrary selection of one prospect M-UPE for each pool area, except the pool area to which the UE initially registered. However, it may as well only comprise the request for information about UPEs in the neighboring areas, without conducting the selection at this point.

Moreover, in case the UE moves to the pool area it initially registered to, and in case the BM-SC 101 was informed about the arbitrary selected UPE of each pool area during the first preparation phase of the handover procedure according to the embodiment of the invention, it is advantageous to indicate to the BM-SC 101 to cancel said pre-registration procedure for all the UPEs of the other pool areas, thus freeing the corresponding reserved resources.

Accordingly, in the other case where the BM-SC 101 is not previously informed about the prospect UPEs in all neighboring pool areas, no canceling of the pre-registration is necessary. The M-MME may just delete the state associated with the pre-selection for that specific UE.

Another embodiment of the invention relates to the implementation of the above described various embodiments using hardware and software. It is recognized that the various embodiments of the invention above may be implemented or performed using computing devices (processors), as for example general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the present invention may also be implemented by means of software modules which are executed by a processor or directly in hardware. Also a combination of software modules and a hardware implementation may be possible. The software modules or instructions may be stored on any kind of computer readable storage media, for example RAM, EPROM, EEPROM, flash memory, registers, hard disks, CD-ROM, DVD, etc.

The invention claimed is:

1. A method for managing mobility of a mobile terminal receiving a multicast service from a service provider via a first access node, wherein the first access node is assigned to a first and at least a second pool area simultaneously, the multicast service is provided between the service provider and the first access node via a first user plane entity of the first pool area, the method comprising:
    after connection of the mobile terminal to the first access node, requesting from the service provider information about user plane entities in the at least second pool area,
    arbitrarily selecting a second user plane entity in the at least second pool area, and
    after completing an access node change of the mobile terminal from the first access node to a second access node in the at least second pool area, changing the user plane entity, via which the multicast service is provided between the service provider and the second access node, from the first user plane entity in the first pool area to the arbitrarily selected second user plane entity in the at least second pool area.

2. The method for managing mobility of claim 1, wherein the mobile terminal is served by a mobility management entity, and wherein the steps of requesting information, arbitrarily selecting, and changing the user plane entity are conducted by the mobility management entity.

3. The method for managing mobility of claim 1, wherein the step of arbitrarily selecting is conducted upon the mobile terminal connecting to the first access node and before requesting from the service provider the information about the user plane entities in the at least second pool area.

4. The method for managing mobility of claim 2, wherein a connection complete message, comprising an identifier of the at least second pool area, is transmitted from the mobile terminal or the first access node to the mobility management entity upon connection of the mobile terminal to the first access node, and the method further comprises identifying by the mobility management entity the first access node as being assigned to at least two pool areas simultaneously, based on the connection complete message.

5. The method for managing mobility of claim 4, wherein the connection complete message is transmitted from the mobile terminal or the first access node to the mobility management entity via the first user plane entity.

6. The method for managing mobility of claim 3, wherein the step of requesting further comprises informing the service provider about the arbitrarily selected second user plane entity in the at least second pool area.

7. The method for managing mobility of claim 1, wherein the requested information about the user plane entities in the at least second pool area comprises information about which user plane entities are serving the multicast service in the at least second pool area.

8. The method for managing mobility of claim 2, wherein the access node change from the first access node to the second access node comprises transmitting a Multimedia Broadcast Multicast Service (MBMS) context of the mobile terminal from the first access node to the second access node in the at least second pool area.

9. The method for managing mobility of claim 2, further comprising, upon completing the access node change of the mobile terminal to the second access node, transmitting a pool area change complete notification to the mobility management entity, comprising identification of the at least second pool area.

10. The method for managing mobility of claim 9, wherein the pool area change complete notification is transmitted to the mobility management entity, via the second user plane entity and subsequently via backbone connections of a network.

11. The method for managing mobility of claim 7, wherein the step of arbitrarily selecting the second user plane entity further comprises adapting the arbitrary selection of the second user plane entity according to the requested information about which user plane entities are serving the multicast service in the at least second pool area.

12. The method for managing mobility of claim 11, wherein the step of adapting the arbitrarily selected second user plane entity comprises, in case no user plane entity is serving the multicast service in the at least second pool area, confirming the arbitrarily selected second user plane entity, and in case at least one user plane entity is serving the multicast service in the at least second pool area, arbitrarily selecting one of the at least one user plane entities serving the multicast service in the at least second pool area as the second user plane entity.

13. The method for managing mobility of claim 11, wherein the step of changing the user plane entity via which the multicast service is provided comprises, upon adapting the arbitrary selection of the second user plane entity, informing the service provider about the adapted arbitrarily selected second user plane entity.

14. The method for managing mobility of claim 11, wherein the step of changing the user plane entity via which the multicast service is provided comprises, upon adapting the arbitrary selection of the second user plane entity, transmitting service context data to the adapted arbitrarily selected second user plane entity, comprising information about the multicast service.

15. The method for managing mobility of claim 13, further comprising in case the one of the at least one user plane entities serving the multicast service in the at least second pool area is selected as the second user plane entity, transmitting from the second user plane entity a private Internet Protocol (IP) multicast address utilized by the second user plane entity, for providing the multicast service, to the mobility management entity, upon receiving the service context data, and in case no user plane entity in the one of the at least second pool area is serving the multicast service and the arbitrarily selected second user plane entity is confirmed, acquiring by the second user plane entity a private IP multicast address and transmitting the acquired private IP multicast address to the mobility management entity, upon receiving the service context data.

16. The method for managing mobility of claim 15, further comprising, upon receiving the private IP multicast address or the acquired private IP multicast address of the second user plane entity, transmitting from the mobility management entity an identifier of the multicast service and the private IP multicast address or the acquired private IP multicast address of the second user plane entity to the second access node.

17. The method for managing mobility of claim 15, further comprising, in case the one of the at least one user plane entities serving the multicast service in the one of the at least second pool area is selected as the second user plane entity, transmitting from the second user plane entity an identifier of the multicast service and the private IP multicast address to the second access node, after receiving the service context data, and in case no user plane entity in the at least second pool area is serving the multicast service and the arbitrarily selected second user plane entity is confirmed, transmitting from the second user plane entity an identifier of the multicast service and the private IP multicast address to the second access node, after acquiring the private IP multicast address.

18. The method for managing mobility of claim 1, wherein the first access node is further assigned to at least a third pool area simultaneously with the first and the at least second pool area, and wherein the step of requesting from the service provider information about user plane entities in the at least second pool area, further comprises requesting from the service provider information about user plane entities in the at least third pool area, wherein the step of arbitrarily selecting further arbitrarily selects for each of the at least third pool area at least a third user plane entity, respectively.

19. The method for managing mobility of claim 1, wherein the step of arbitrarily selecting is conducted, after requesting from the service provider information about user plane entities in the at least second pool area, or after completing the access node change from the first access node to the second access node in the at least second pool area.

20. A mobility management entity of a first pool area serving a mobile terminal to receive a multicast service from a service provider via a first access node, wherein the first access node is assigned to the first and at least a second pool area simultaneously, the multicast service being provided between the service provider and the first access node via a first user plane entity of the first pool area, the mobility management entity comprising:
  a transmitter configured to transmit a request to the service provider for information about user plane entities in the at least second pool area, after receiving via a receiver information about a connection of the mobile terminal to the first access node, and
  a processor configured to arbitrarily select a second user plane entity in the at least second pool area,
  wherein the receiver is further configured to receive a notification about the mobile terminal changing from the first access node to a second access node in en of the at least second pool area, and
  wherein the transmitter is further configured to transmit a change notification to the service provider and to the arbitrarily selected second user plane entity to change the user plane entity, via which the multicast service is provided between the service provider to the second access node, from the first user plane entity in the first pool area to the arbitrarily selected second user plane entity in the at least second pool area.

21. The mobility management entity of claim 20, wherein the processor is configured to arbitrarily select the second user plane entity in the at least second pool area, upon the mobile terminal connecting to the first access node and before requesting from the service provider the information about the user plane entities in the at least second pool area, or
after requesting from the service provider the information about the user plane entities in the at least second pool area, or after completing the access node change from the first access node to the second access node in the at least second pool area.

22. The mobility management entity of claim 20, wherein the processor is further configured to identify the first access node as being assigned to at least two pool areas simultaneously, upon receiving a connection complete message from the mobile terminal or the first access node, comprising an identifier of the at least second pool area.

23. The mobility management entity of claim 20, wherein the transmitter is further configured to transmit information about the arbitrarily selected second user plane entity to the service provider together with the request for information.

24. The mobility management entity of claim 20, wherein the processor is further configured to adapt the arbitrarily selection of the second user plane entity according to the requested information about user plane entities in the at least second pool area.

25. A service provider configured to provide a multicast service to a mobile terminal via a first access node, wherein the first access node is assigned to a first and at least a second pool area simultaneously, the multicast service being provided between the service provider and the first access node via a first user plane entity of the first pool area, wherein the mobile terminal is served by a mobility management entity, wherein the service provider comprises:
a receiver configured to receive a request from the mobility management entity, for requesting information about user plane entities in the at least second pool area, and
a transmitter configured to transmit said information about user plane entities in the at least second pool area to the mobility management entity.

26. The service provider of claim 25, wherein the receiver is further configured to receive information about a user plane entity in the at least second pool area, having been arbitrarily selected by the mobility management entity.

\* \* \* \* \*